United States Patent
Salyards et al.

(10) Patent No.: US 10,698,573 B2
(45) Date of Patent: *Jun. 30, 2020

(54) GRAPHICAL USER INTERFACE TO FACILITATE MANAGING MEDIA OPERATIONS

(71) Applicant: IMAGINE COMMUNICATIONS CORP., Frisco, TX (US)

(72) Inventors: Michael J. Salyards, Parker, CO (US); Charles P. Lotz, Rancho Cordova, CA (US); Csaba Felvegi, Dunakeszi (HU)

(73) Assignee: IMAGINE COMMUNICATIONS CORP., Frisco, TX (US)

(*) Notice: Subject to any disclaimer, the term of this patent is extended or adjusted under 35 U.S.C. 154(b) by 183 days.

This patent is subject to a terminal disclaimer.

(21) Appl. No.: 15/811,288

(22) Filed: Nov. 13, 2017

(65) Prior Publication Data

US 2018/0067618 A1    Mar. 8, 2018

Related U.S. Application Data

(63) Continuation of application No. 14/697,226, filed on Apr. 27, 2015, now Pat. No. 9,817,553, which is a
(Continued)

(51) Int. Cl.
*G06F 3/048* (2013.01)
*G06F 3/0482* (2013.01)
(Continued)

(52) U.S. Cl.
CPC ........ *G06F 3/0482* (2013.01); *G06F 3/04817* (2013.01); *G06F 9/542* (2013.01);
(Continued)

(58) Field of Classification Search
CPC ...................................................... G06F 3/048
See application file for complete search history.

(56) References Cited

U.S. PATENT DOCUMENTS

| | | |
|---|---|---|
| 6,118,450 A | 9/2000 | Proehl et al. |
| 6,282,548 B1 | 8/2001 | Burner et al. |

(Continued)

FOREIGN PATENT DOCUMENTS

WO    200028396 A2    5/2000

OTHER PUBLICATIONS

International Search Report and Written Opinion; International Application No. PCT/US2012/053815, International Filing Date: Jun. 9, 2012; Authorized Officer: Thomas Hindelang; Date of Completion: Dec. 21, 2012; 11 Pgs.

*Primary Examiner* — Pei Yong Weng
(74) *Attorney, Agent, or Firm* — Tarolli, Sundheim, Covell & Tummino LLP

(57) ABSTRACT

A system can comprise a memory for storing machine readable instructions and a processing unit for accessing the memory and executing the machine readable instructions. The machine readable instructions can comprise an automation client to facilitate managing media operations. The automation client can comprise a graphical user interface (GUI) generator to provide a GUI. The GUI can concurrently provide a plurality of modes of operation for a plurality of playlists in a graphical framework.

20 Claims, 12 Drawing Sheets

Related U.S. Application Data continuation of application No. 13/228,015, filed on Sep. 8, 2011, now Pat. No. 9,021,355.

(51) Int. Cl.

| | | |
|---|---|---|
| *G06F 16/44* | (2019.01) | |
| *G06F 16/74* | (2019.01) | |
| *G06F 16/638* | (2019.01) | |
| *H04N 21/262* | (2011.01) | |
| *H04N 21/482* | (2011.01) | |
| *H04N 21/431* | (2011.01) | |
| *G06F 3/0481* | (2013.01) | |
| *G06F 9/54* | (2006.01) | |

(52) U.S. Cl.
CPC ............ *G06F 16/44* (2019.01); *G06F 16/638* (2019.01); *G06F 16/74* (2019.01); *H04N 21/26258* (2013.01); *H04N 21/4312* (2013.01); *H04N 21/4825* (2013.01)

(56) References Cited

U.S. PATENT DOCUMENTS

| | | |
|---|---|---|
| 7,886,054 B1 | 2/2011 | Nag et al. |
| 2002/0013852 A1 | 1/2002 | Janik |
| 2003/0167466 A1 | 9/2003 | Nakamura et al. |
| 2005/0062935 A1* | 3/2005 | Bubie .................... G06Q 10/06 352/40 |
| 2005/0197906 A1* | 9/2005 | Kindig .................. G06Q 30/02 705/15 |
| 2006/0143236 A1* | 6/2006 | Wu ....................... G11B 27/034 |
| 2006/0268667 A1* | 11/2006 | Jellison, Jr. .......... G11B 27/034 369/30.08 |
| 2007/0260677 A1* | 11/2007 | DeMarco ........... H04N 21/4825 709/203 |
| 2008/0066010 A1 | 3/2008 | Brodersen et al. |
| 2009/0164032 A1 | 6/2009 | Kedem |
| 2009/0182843 A1 | 7/2009 | Hluchyj et al. |
| 2009/0193465 A1 | 7/2009 | Yi |
| 2009/0276803 A1 | 11/2009 | Weaver |
| 2010/0095332 A1* | 4/2010 | Gran .................. H04N 21/4122 725/93 |
| 2010/0280642 A1 | 11/2010 | Skata |
| 2010/0332919 A1 | 12/2010 | Ito et al. |

\* cited by examiner

GRAPHICAL USER INTERFACE TO FACILITATE MANAGING MEDIA OPERATIONS

CROSS-REFERENCE TO RELATED APPLICATION

This application is a Continuation of U.S. patent application Ser. No. 14/697226, filed on Apr. 27, 2015, and entitled GRAPHICAL USER INTERFACE TO FACILITATE MANAGING MEDIA OPERATIONS (now U.S. Pat. No. 9,817,553), which is a Continuation of U.S. patent application Ser. No. 13/228015, filed on Sep. 8, 2011, and entitled GRAPHICAL USER INTERFACE TO FACILITATE MANAGING MEDIA OPERATIONS (now U.S. Pat. No. 9,021,355). The entirety of each of the above-identified applications is herein incorporated by reference.

TECHNICAL FIELD

This disclosure relates to media operations. More particularly, this disclosure relates to a graphical user interface to facilitate managing media operations.

BACKGROUND

A playlist can be implemented as a list of media events (e.g., media assets), such as video and/or audio clips, still and/or animated graphics, character graphic (CG) overlays, transition effects, and related data elements. The media events can include, for example, pre-recorded television programs, live television programs or the like. The media events can be played in a sequential or shuffled order. For example, some elements (e.g., secondary events) can be executed concurrently with a primary sequence (e.g., primary events). In the broadcast industry, a broadcast user can be tasked with several playlist tasks concurrently, such as monitoring, management, and intervention of multiple playlists concurrently. However, existing technologies tend to make the management of multiple playlists difficult or cumbersome.

SUMMARY

One aspect relates to a system that includes a memory for storing machine readable instructions and a processing unit for accessing the memory and executing the machine readable instructions. The machine readable instructions can include an automation client to facilitate managing media operations, the automation client comprising a graphical user interface (GUI) generator to provide a GUI that includes a plurality of interactive playlists derived from abstracted media data. The plurality of playlists can be presented concurrently in a graphical framework within which each of the plurality of playlists is programmed to operate in a selected mode of operation in response to a user input.

Another aspect relates to a computer readable medium having machine readable instructions that includes a graphical user interface (GUI) generator. The GUI generator can provide a GUI to facilitate managing media events. The GUI generator instantiates a playlist object to provide a plurality of playlists for media channels based on media data provided by an automation system. The GUI includes a dashboard, corresponding to a graphical framework, in which a first plurality of interactive playlists for a plurality of respective channels are concurrently displayed without obstruction, the GUI also comprising a second graphical framework comprising a timeline view of at least one second playlist for at least one media channel.

Yet another aspect relates to a method that includes abstracting media data received from an automation server and generating a graphical user interface (GUI) based on the abstracted media data. The abstracted media data can be used to instantiate a playlist object to concurrently provide a plurality of playlists within a graphical framework of the GUI, a given playlist of the plurality of playlists is programmed to switch, in response to a user input, from a first mode of operation to a second mode of operation, different from the first, without obstructing other playlists in the graphical framework.

DETAILED DESCRIPTION

This disclosure relates to a graphical user interface (GUI) to facilitate managing media operations. The GUI can be provided to a user via an interactive device (e.g., a computer or workstation) to enable the user to mange media operations. In one example, the interface can allow the user to graphically concurrently manage a plurality of playlists, which can be presented in multiple modes of operation. Moreover, the GUI can switch between modes of operation for one or more (e.g., each) of the plurality of playlists in response to a user input. The different modes of operation for each such playlist can occupy the same graphical framework in the interface as to not obstruct the graphical framework for other playlists.

The real time automation, consisting of one or more servers, can communicate with a middle tier service to provide an abstraction, which in turn provides the abstraction to multiple clients. Such an approach makes the overall system more consistent, allows lighter weight clients, and provides abstracted interfaces to outside systems. This also allows non-real time behaviors to be implemented in the middle tier rather than in the automation server, including access to various data sources, such as enhanced metadata and related elements that are not part of the real time automation server's scope.

Figure 1:
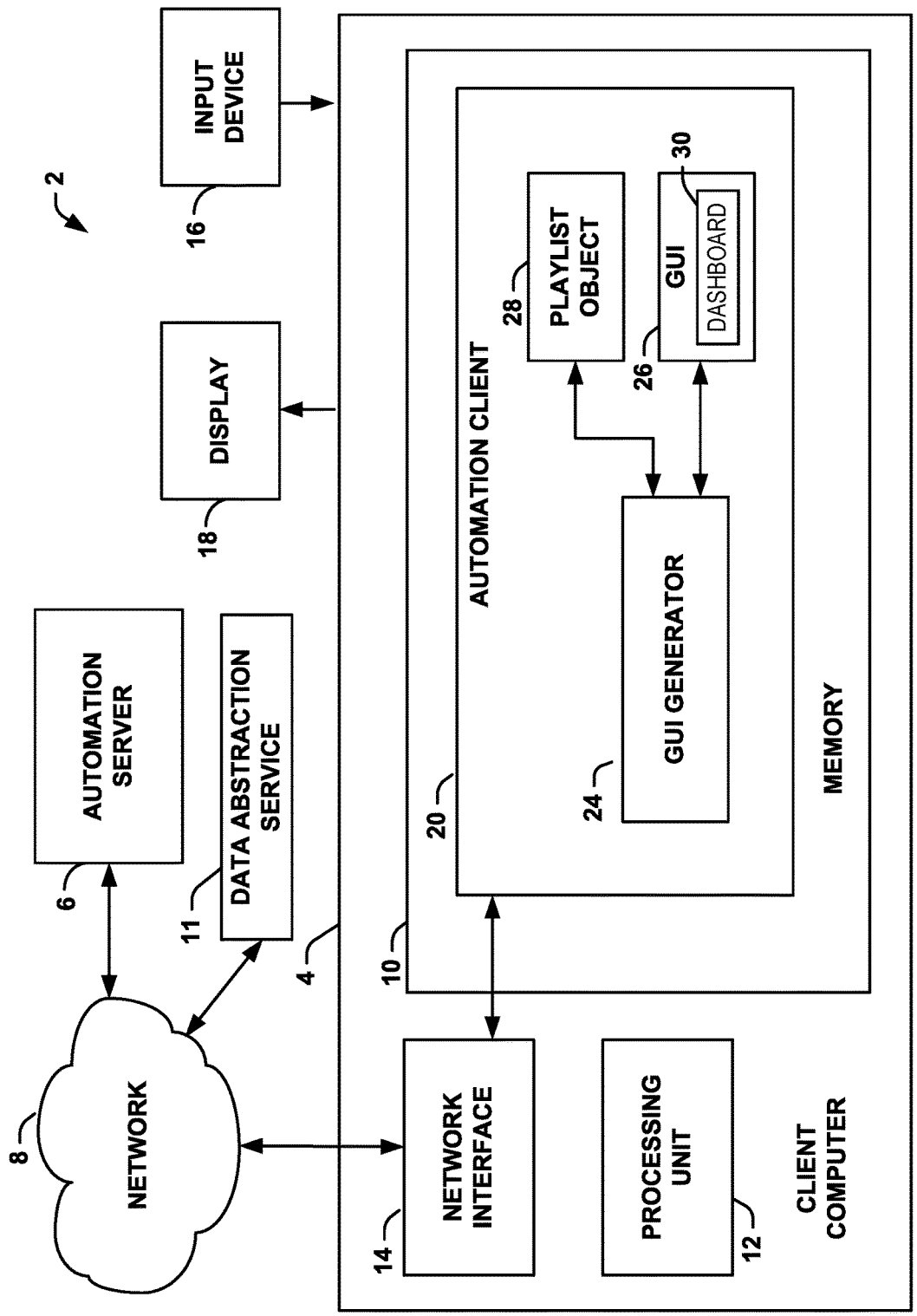
FIG. 1 illustrates an example of a system to facilitate managing media operations.

FIG. 1 illustrates an example of a system 2 to facilitate managing media operations. The system 2 can include a client computer 4 that can communicate with an automation server 6 over a network 8. The system 2 could be employed, for example in a media broadcast system, such as can include one or more of a cable television broadcast system, broadcast television system that includes one or more channels and subchannels, a satellite television broadcast system, a digital signage system, a telephone-television distribution system or the like.

The network 8 could be implemented, for example, as a network 8 that employs TCP/IP, IPv6, or the like, such as the Internet or a private local area network. The client computer 4 could be implemented, for example, as a desktop computer, a laptop computer, a tablet computer or the like. The system 2 can include a memory 10 for storing machine-readable instructions. In one example, the clients can store little or no local data. For instance, the clients can be dynamically linked to the abstraction service and the automation server.

The memory 10 could be implemented, for example, as volatile memory (e.g., random access memory), non-volatile memory (a hard disk, flash memory or the like) or a combination thereof. The system 2 can also include a processing unit 12 to access the memory 10 and to execute the machine-readable instructions. The processing unit 12 can be implemented, for example, as including one or more processor cores. The system 2 can be coupled to the network 8 via a network interface 14. The network interface 14 could be implemented, for example, as a network interface card. The automation server 6 could be implemented, for example, in a manner similar to the client computer 4 (e.g., including a processing unit and memory).

The automation server 6 can be programmed to control distribution of media assets to a plurality of subscribers. In one example, the automation server 6 can be implemented to execute a media schedule for one or more channels, such as to issue real time commands to broadcast devices for executing events (e.g., play command to a playout device, a switch command to a switch or the like). Moreover, the automation server 6 can store playlist data and related scheduling information to control devices for any number of channels, such as can be part of a broadcast media system.

The automation server 6 can implement a dynamic (e.g., real time) application programming interface (API) to utilize an abstraction service 11. For example, the automation server 6 can be programmed to employ the API to maintain a dynamic network connection to the abstraction service 11, which provides at least a substantial portion of abstraction that can be provided to the automation client. The abstraction service 11 can employ rules and access other related data and forms of media that can be abstracted and provided to the client 4 (e.g., in real time) based on the data passed by the automation server 6 to the abstraction service 11 via the API. Various other applications may also implement similar APIs to access the methods and functions implemented by the abstraction service 11. The automation server 6 and abstraction service 11 might also be implemented on redundant platforms to provide high availability.

The client computer 4 can also communicate with the abstraction service 11 via the network 8, which can be bi-directional communication. The automation client 20 implemented on the client computer 4 can receive abstracted data from the abstraction service 11, for example, in real time. Thus, the abstraction service 11 can provide the underlying data that is displayed via an automation client 20. Additionally, user inputs (e.g., receive via the user input device 16) similarly can be passed from the automation client 20 to the abstraction service 11 and then to the automation server 6 to modify the corresponding data and related automation controls.

The automation client 20 can manage the playlists for each of the plurality of channels, such as can include viewing, editing or other manipulation of media assets for each respective channel. Additionally, the automation client 20 can also attend to related tasks, such as media preparation, automated and manual workflow management, and diagnostics and troubleshooting. That is, the GUI can be programmed to allow not only playlist management, such as based on the abstracted data from the automation server, but also to conveniently, in a common GUI space, perform related functions.

By way of example, the data abstraction service 11 can parse the schedule data and extract metadata and/or data fields from the schedule data, which can be referred to as extracted data. The extracted data can be abstracted by the data abstraction service 11 and can be combined with other data and media into abstracted data. The abstraction service 11 can provide this abstracted data to the automation client 20 in real time. The data abstraction service 11 can execute, for example, on an intermediate layer in the system 2 that resides between the automation server 6 and the automation client 20. The abstraction service 11 and the automation client 20 can be co-located a common site or be distributed.

The client computer 4 can include an input device 16 (e.g., a mouse, keyboard, a touch screen, a combination thereof or the like) that receives user input. The client computer 4 can also include a display 18 (e.g., a monitor) that provides user output (e.g., graphics and text). In one example, the memory 10 of the client computer 4 can include the automation client 20 that can be employed to manage the media operations. There can be any number of automation clients 20 implemented in the system 2. Based on the abstracted data, the automation client 20 can provide a GUI 26 that is programmed for efficient management of multiple automation playlists within a single user interface graphical framework, which graphical framework can be referred to as a frame.

To manage the media operations, the automation client 20 can receive the abstracted data from the abstraction service 11. The abstracted data can include abstracted playlist data, extended metadata, low resolution video or the like. The abstraction service 11 can control the format and types of information and data sent to the automation client 20 based on predefined rights for the automation client 20. For example, during initial operation, the automation client 20 registers with or logs into the abstraction service 11 via the network, which results in the flow of abstracted data to the automation client 20 (e.g., in real time).

The schedule data can include data characterizing a playlist for each of the plurality of channels provided to the subscribers via one or more media delivery systems. Moreover, in some examples the schedule data can include video files employable as output for the plurality of channels. The video files could be implemented, for example, as Moving Pictures Expert Group (MPEG) files, raw video files or the like.

A GUI generator 24 of the automation client 20 can employ the abstracted data to generate a GUI 26 for a user of the client computer 4. The GUI generator 24 can operate, for example, on a presentation layer of the automation client 20. The GUI 26 can provide a plurality of interactive views to that characterizes the abstracted data. The automation client 20 can also include a playlist object 28 programmed to provide playlist functionality. The GUI generator 24 can instantiate the playlist object 28 based on the abstracted data for a given channel to provide a corresponding playlist interface. Thus, depending on application requirements, the GUI generator 24 can provide a corresponding instance of the playlist object 28 for each channel. Each instance of the playlist object 28 can operate as a GUI independently of other playlist instances based on the abstracted data for its respective channel and in response to user input (e.g., via the input device 16).

As disclosed herein, each instance of the playlist object can switch between multiple different modes (e.g., a view mode and an edit mode) without obstructing other objects. Moreover, such modes and related views allow both monitoring and control in a smaller amount of screen real estate (GUI space) than many existing systems, which allows for a larger number of channels to be effectively be managed concurrently within a given GUI 26. Additionally or alternatively, one or more channels can be more effectively managed while a user simultaneously performs other related tasks through other objects provided within the same GUI 26.

For example, the GUI 26 can include a dashboard 30 that contains the playlists for display in a common graphical framework. There can be any number of playlists presented within the graphical framework provided by the dashboard. The design of the dashboard 30 can be specifically programmed to allow the effective management of each channel in a significantly smaller area than traditional views, allowing a larger number of lists to be managed. The dashboard 30 (e.g., via operating in a view mode) can enable the user to view and edit media assets and scheduling information for each playlist for a relatively short period of time. As one example, the view mode can be implemented within the GUI 26 to provide only the current and next primary events, each including a mini-timeline GUI element showing the associated secondary events, and one or more next errors, if any, for that channel. Such a mode of operation, for instance, allows the operator to monitor the playout of an automated channel where it is assumed that intervention is an exception. Switching to an edit/list view in response to a user input can allow the entire list, including future and past events, to be accessed for management. Such events can be accessed and managed via the GUI 26; although, only a certain portion of the list and a certain portion of the event metadata may be rendered visible to the user.

Edits to the playlist can adjust media ingress parameters for a given channel. Moreover, the dashboard 30 can provide abstracted graphical representations (e.g., graphical elements with no or minimal text) based on the certain metadata or combinations in the schedule data. By employment of the dashboard, the user can switch between modes of a given playlist instance to view or edit a given playlist in the same graphical framework without obstructing other playlists. That is, each playlist can switch between different modes of operation to provide different interactive functionality that is represented to the user within the same graphical framework of the dashboard. Moreover, in some examples, the dashboard 30 can bring errors and potential conflicts to a user's attention. The errors can be identified in a time-prioritized manner, such can be user-defined or operate on default prioritization for errors. Thus, the identification of errors in this manner can automatically identify potential conflicts or malfunctions, in a time prioritized manner, as to limit the need for the user to search for issues. Thus, the GUI 26 can allow users to maintain a "manage by exception" process. This, in turn, can allow the user to potentially perform additional tasks while still effectively monitoring multiple channels.

As another example, the GUI 26 can provide a list view that allows a user to view and edit detailed information about a plurality of events in a given playlist. In some examples, the list can allow the user to view and correct errors. In yet another example, the GUI 26 can provide a timeline view that allows the user to view a playlist for each of a plurality of channels over a relatively long period of time (e.g., about 3-8 hours) relative to the scheduling information for each playlist. For example, the timeline view can include an inherent conflict in that, when the view is set to show a large span of time, detail, particularly for short durations or intervals, may be lost, while a view that shows a great deal of detail may not show longer term perspective. Combining the dashboard view, which continually provides a high degree of detail, which can be dynamically updated to the current and upcoming event for each list, with a larger, multi-channel timeline that can be used to show larger context, overcomes this limitation.

The timeline view can also provide abstracted graphical representations of metadata in the schedule data. In some examples, the GUI 26 can provide multiple views concurrently. For instance, in some instances, the GUI 26 can provide a dashboard container with multiple playlists, as disclosed herein, and another GUI container that includes the list view and/or the timeline view. In other examples, the GUI can provide multiple GUI containers with the same view, such as two frames, each with a list view. The dashboard view, even with a high degree of abstraction, can provide only a subset of the total list and fields. For example, the list view can be tied to multiple dashboard views such that multiple dashboards can be employed in a given GUI to monitor multiple channels simultaneously, with any one list at a time selected for more detailed examination or control in the list view, all within a single GUI.

Through interaction with the user and the GUI, changes (e.g., updates to a playlist) to the abstracted data can be made at the GUI generator 24 and returned to the data abstraction service 11 via a corresponding API. For instance, the data abstraction service 11 can convert the changes to the abstracted data into a format readable by the automation server 6, which data can be referred to as updated data. The updated data can be provided to the automation server 6, such that the automation server 6 can provide media to the plurality of subscribers based on the updated data. The update data can also be propagated to other related applications in the system 2.

The system 2 enables the user to efficiently view and edit the playlists for each of the plurality of channels provided to the plurality of subscribers. Moreover, in time critical operations, the user need not change views and/or obscure portions of the GUI to edit playlists. Further, by employment of the pictorial representations, the user can process information more efficiently, and with a greater degree of accuracy, since fatigue associated with reading large amounts of text data can be reduced.

Figure 2:
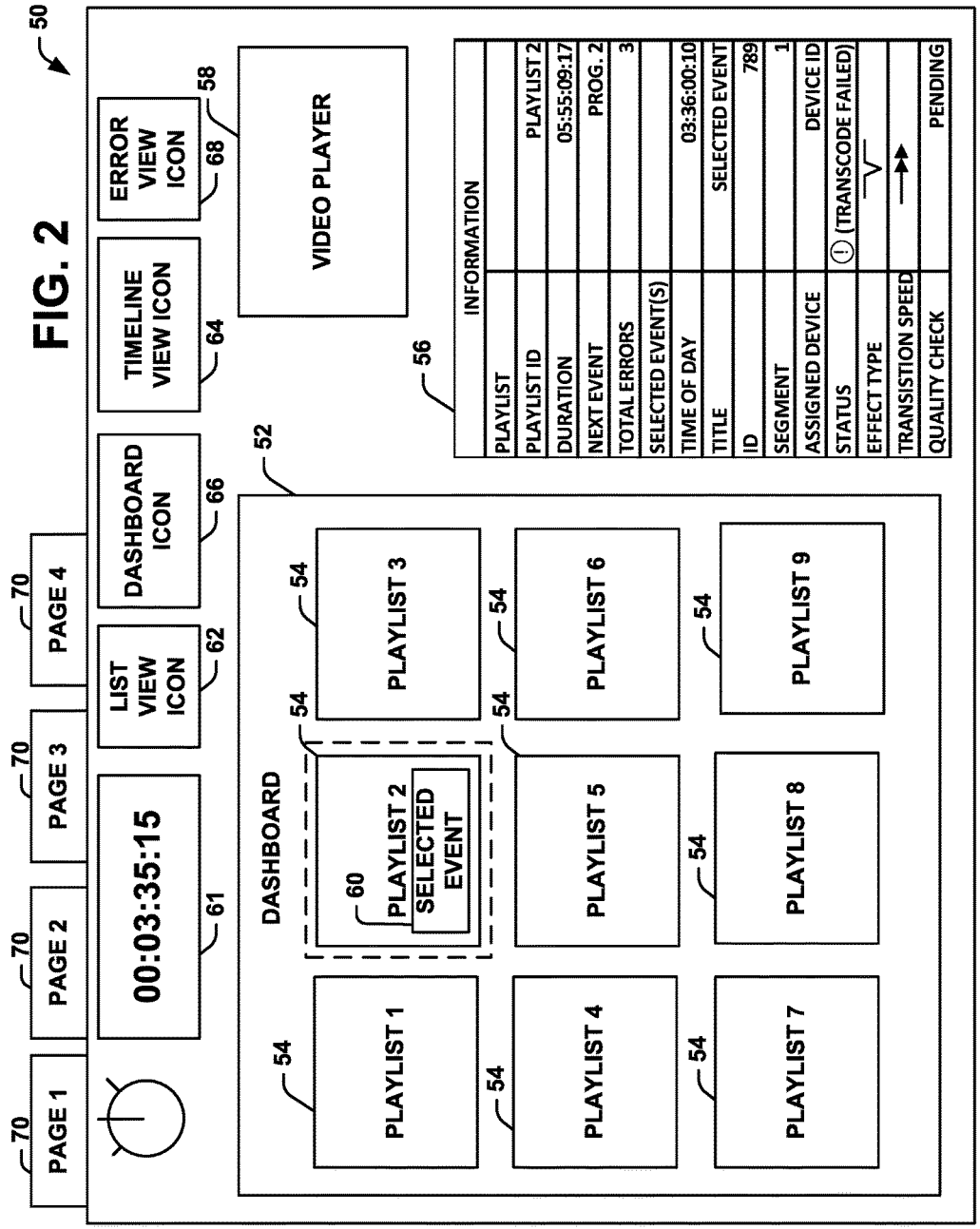
FIG. 2 illustrates an example of a graphical user interface (GUI) that can be employed to facilitate managing media operations.

FIG. 2 illustrates an example of a GUI 50 (e.g., the GUI 26 of FIG. 1) that includes a dashboard 52 that provides a playlist GUI container. In the example GUI 50, the dashboard 52 includes a plurality of playlists 54 (demonstrated as PLAYLIST 1 through PLAYLIST 9). While nine playlists 54 are demonstrated in FIG. 2, other examples could include more or less playlists. The dashboard 52 can be resized, such that more or less playlists could be shown in the dashboard 52. Additionally, in some examples other frames, such as an information frame 56 and/or a video player 58 can be resized and/or removed to accommodate resizing of the dashboard 52.

Each of the playlists 54 are programmed to operate in multiple modes corresponding to different aspects of managing (e.g., adding, removing, editing and monitoring) playlist data. In the example of FIG. 2, playlists 1 and 3-9 are illustrated as being in a view mode, while PLAYLIST 2 is illustrated as being in an edit mode. Further as illustrated, each of the playlists 54 occupies a separate graphical context within the dashboard 52, the frame for which can remain unmodified in response to changing between respective playlist modes. For example, in response to a user input to switch a given playlist from one mode to another mode, the content and function of the given playlist can change accordingly without obstructing any of the other playlists in the dashboard 52.

By way of further example, in FIG. 2, PLAYLIST 2 (in edit mode) includes a selected event 60. The event can be selected, for example, in response to a user input activating the selected event (e.g., clicking on the selected event) and/or the PLAYLIST 2.

The GUI can also include information frame 56 programmed to provide detailed information about the selected event 60. For instance, the detailed information can include a playlist identifier that identifies a playlist associated with the selected event 60. Additionally, the detailed information can include a duration time (labeled in FIG. 2 as "DURATION") for the playlists associated with the selected event 60. Further, the detailed information can include a next event identifier (labeled in FIG. 2 as "NEXT EVENT") that identifies an event (e.g., a video clip) following an on-air media event (e.g., an event currently being played). Further still, the detailed information can also include a total number of errors present in the playlist (labeled in FIG. 2 as "TOTAL ERRORS"). In addition to the specific data and types of data that might be shown in the 'information frame, part of the architecture of the system, with the middle abstraction service (e.g., service 11 of FIG. 1) providing an abstraction of, for example, not only the real time automation server, but also additional data (e.g., extended metadata, low resolution video, images, or the like) accessed via the abstraction service.

The detailed information can also include specific information about the selected event 60. The specific information can include, for example, a start time (in a given day) for the selected event (labeled in FIG. 2 as "TIME OF DAY"). The specific information can also include a title of the event (labeled in FIG. 2 as "TITLE"). The title of the event can be, for example, a file name of a video clip associated with the selected event 60. The specific information can further include an event identification number (labeled in FIG. 2 as "ID") that can be employed as a unique identification code for the selected event 60. The specific information can still further include a segment number for the selected event 60 (labeled in FIG. 2 as "SEGMENT"). The segment number can correspond to a series number of the selected event 60. For instance, in some examples, a television program may have multiple segments that are separated by commercials. The segment number of the selected event 60 can identify a position of the selected event 60 position relative to other segments.

The specific information can also include an assigned device identifier (labeled in FIG. 2 as "ASSIGNED DEVICE") that can identify a device (e.g., a database and/or a directory) that stores the video clip corresponding to the selected event 60. The specific information yet further includes an error status (labeled in FIG. 2 as "STATUS"). The error status can indicate a particular error associated with the selected media event 60 for a given channel. The error status can include an icon that can draw attention to the error status and employ corresponding color coding. Moreover, the error status can also include a description of the status. In the present example, such a description is labeled as "TRANSCODE FAILED," which can indicate that a transcoding between video formats has failed. Such a failure could occur, for example, due to lost packets, and/or data corruption (e.g., due to a hardware and/or software malfunction). With a dashboard view, the indication of upcoming errors can further make use of this 'information frame' to provide more detailed information about the error. The operator can directly access the error, with detailed information, such as can be provided directly from the view mode without any other disruption to their view.

In some examples, the specific information can include an effect type represented as an icon, as well as a transition speed. The effect type can represent a transition event that occurs before the selected event 60 is played. The transition speed can indicate, for example, the speed at which the video clip associated with the selected event 60 will transition relative to a previous event. The transition speed and the effect type can also be represented as GUI elements, such as one or more icons or a corresponding composite icon.

The video player 58 can be included in the GUI 50 for playing video clips, such as the video clips associated with one or more of the playlists 1-9. The current and next video can also be presented in the respective playlists 54. Additionally, the GUI 50 can include a clock 61 that can give a current time. Moreover, the GUI 50 can include a list view icon 62 that can change/add a frame that depicts a list view as well as a timeline view icon 64 that can change/add a frame that depicts a timeline view. In some examples, the GUI 50 can include a dashboard icon 66 that can be activated to add a second frame with a second dashboard. In other examples, the GUI 50 can include a grayed out dashboard icon 66, since in the present example, the dashboard 52 is already shown. The GUI 50 can still further include an error view icon 68 that can depict a list of errors detected for one or more channels corresponding to the playlists 54.

The GUI 50 can include a plurality of page tabs 70 that can provide the user with a mechanism to customize multiple pages of the GUI 50. In this manner, in one instance, Page 1 could depict the dashboard 52, while Page 2 could depict a second dashboard, a list view, a timeline view, a combination thereof or the like. In some examples, the page tabs can be renamed to provide a descriptive indicator for the user. Thus, it will be appreciated that the dashboard 52 allows the user to view and/or edit one or more playlists 54 concurrently without obscuring portions of the other playlists. Moreover, each of the playlists 1-9 can be switched from view or edit mode to the other of view or edit mode without resizing the dashboard or popping up another frame.

Figure 3:
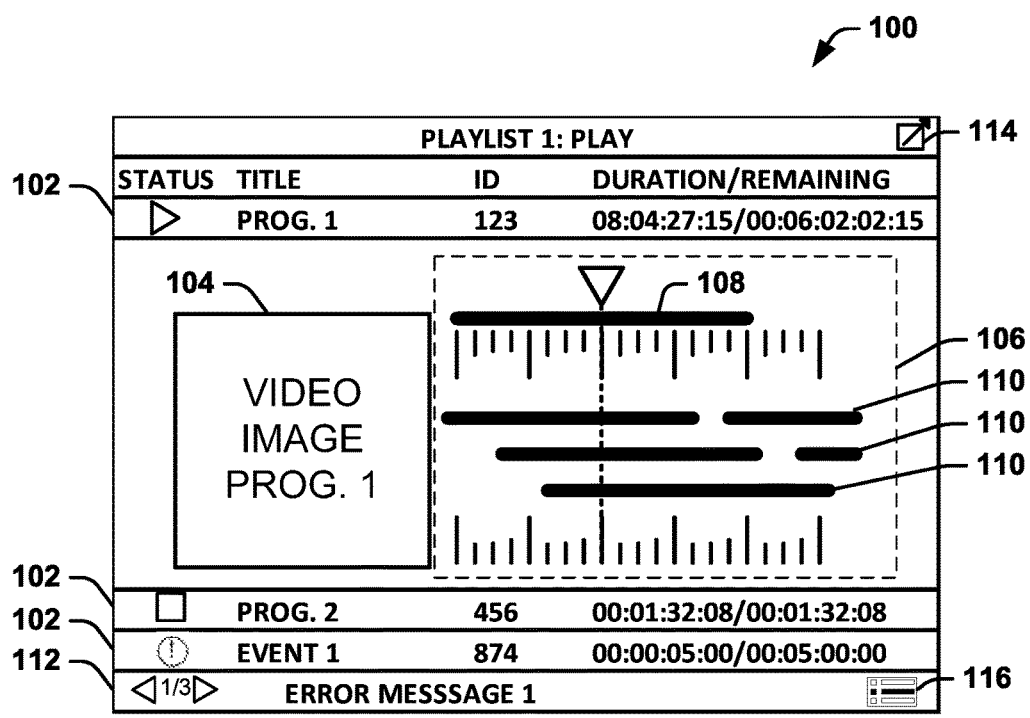
FIG. 3 illustrates of an example of a playlist demonstrating a view mode.

FIG. 3 illustrates an example of a playlist GUI 100 in view mode displayable in a dashboard (e.g., the playlists 1 and 3-9 of FIG. 2). The playlist 100 can include a plurality of events 102. Each of the events 102 can correspond to a scheduled broadcast media event, such as a television program, a commercial or the like. As an example, events in the list can be a mixture of primary and secondary events, with the primary events being provided in an ordered sequence; however, secondary events can be inserted into the sequence of primary events, such that secondary events are located after the primary event from which their timing is calculated and before the next sequential primary event. The view mode can be programmed to automatically interpret some or all of such events and display the resulting interpretation of these relationships in a simplified manner.

As a further example, each event 102 can have a status (labeled in FIG. 3 as "STATUS"). The status can be indicated by an icon in the status column for each media event. For instance, the status can indicate if a particular event 102 is playing, has already played, is to be played in the future, has an error associated with the event 102 or the like. The playlist 100 can also include a title (labeled in FIG. 3 as "TITLE") for each event 102. The title of the event 102 can identify, for example, a name of a media program (e.g. a television program) and/or a file name of a video clip. The playlist 100 can further include an identifier for each event 102 (labeled in FIG. 3 as "ID"). The playlist 100 can further include a time indicator (labeled in FIG. 2 as "DURATION/ REMAINING") that can characterize a duration of an event 102, as well as an amount of time remaining for the event 102.

In some examples, each event 102 can be color-coded such as to indicate a different condition for a given event 102. For instance, one color could indicate that a given event 102 is currently being played. Another color could indicate that another given event 102 is associated with an event 102 being played (e.g., the another event 102 is an additional segment of the same media program). Another color could indicate that a given event 102 is a relatively short independent event 102 (e.g., a television commercial or announcement). Yet another color could indicate an error. In other examples, different colors could be employed in similar or different manners.

In the example of FIG. 3, a first event 102 (labeled in FIG. 2 as "PROG. 1") can include expanded information that can provide more detailed information about the first event 102. In this example, the expanded information can include a video image 104 for the first event 102. The video image 104 can be a pictorial image representing the nature of the event 102. In some examples, the video image 104 could be a logo associated with the event 102, a picture of a person associated with the event 102, the live video feed, or the like. In one example, the playlist GUI 100 can include a "PLAY" GUI element (e.g., a button) that would allow the user to view and/or listen to a clip associated with the first event 102 in response to a user input activating the GUI element.

Additionally, the playlist 100 can include a time bar 106 that can depict the status of a timeframe of the playlist 100 for a relatively short period of time. For example, an upper bar in the example of FIG. 3 is scaled to the duration of the current primary event. The length of the bar relative to the total width can indicate the progress of the event. The time bar 106 can include a primary time bar 108 that characterizes a duration of the first event 102 (e.g., a primary event). In the following example of FIG. 4, there are two such sets of time bars for each dashboard, one for the currently executing event and one for the next sequential primary event. Additionally, the time bar 106 can include one or more secondary time bars 110 that can characterize the duration of secondary events relative to the time line for the first event 102 (e.g., the primary event). A secondary event can correspond to an event that is to be played out concurrently with the primary media event. For example, the secondary events can include video clips and/or graphical images that overlay the first event 102 or audio content that is broadcast with the primary media event. Such secondary events may include television station logos, emergency weather updates, news updates or the like.

The playlist 100 can also include an error row 112. The error row 112 can include GUI elements (e.g., arrows) that are actuatable by the user to scroll through a list of error messages. The error row can be implemented to eliminate, or at least reduce, the need for the operator to actively search through the lists to identify errors. For instance, by constantly showing any errors for each list (e.g., in a time prioritized manner), the operator is alerted to issues that may require the operator's intervention. If no errors are indicated, or any errors indicated have a known resolution (e.g., a pending media transfer, or the errors are sufficiently far in the future), the operator can perform other actions within the GUI, and simply continue monitoring the automated execution of the lists.

The playlist 100 can also include a playlist editor GUI element (e.g., an icon) 114 that can be activated in response to a user input. Upon actuation of the playlist editor 114, for example, the playlist 100 can be switched from a view mode to an edit mode without obstructing other playlist GUIs in the dashboard, such as disclosed herein. Additionally, the playlist 100 can include a 'maximize and jump' GUI element 116 that can be activated in response to a user input. Upon activation of the 'maximize and jump' GUI element 116, a corresponding detailed list view mode of the playlist 100 (e.g., PLAYLIST 1) can be displayed. In a case where multiple dashboards are used simultaneously, a single detailed list view can be shared among all of the lists, with one list at a time selected for display via the associated dashboard. This allows the GUI arrangement to remain constant. Furthermore, if the detailed view is not required, the same screen area that might otherwise be utilized by the detailed list view might be used for other GUI objects, such as those related to other related, but not list specific tasks—without affecting the dashboard views.

Figure 4:
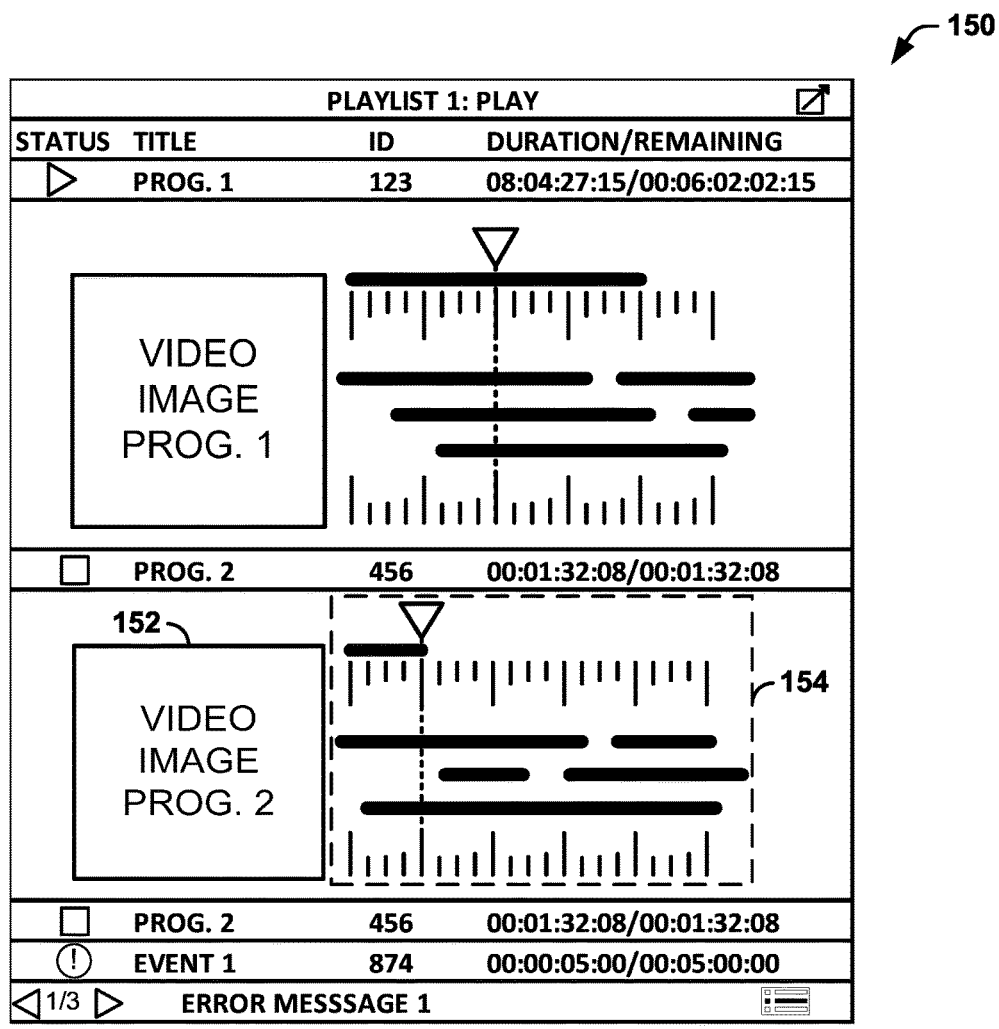
FIG. 4 illustrates another example of a playlist demonstrating a view mode.

FIG. 4 illustrates another example of a playlist GUI 150 demonstrating operation in the view mode, such as can be graphically presented a dashboard (e.g., one of the playlists 1 and 3-9 illustrated in FIG. 2 that includes a mini-timeline). The playlist 150 illustrated in FIG. 4 is similar to the playlist illustrated in FIG. 3. Thus, for purposes of simplification of explanation elements common to both FIGS. 3 and 4 are not repeated.

In the example of FIG. 4, the playlist 150 includes expanded information for a given channels, including time bars for the current and next primary event as well as a video images for each of the events. Thus, in addition to the detailed playlist timeline information for program 1, the playlist 150 includes a video image 152 and a time bar 154 for a second media event, namely PROG. 2. The playlist illustrated in FIG. 4 thus enables a user to preview an image and/or a video for the second event prior to the second event in the given playlist being played out.

Figure 5:
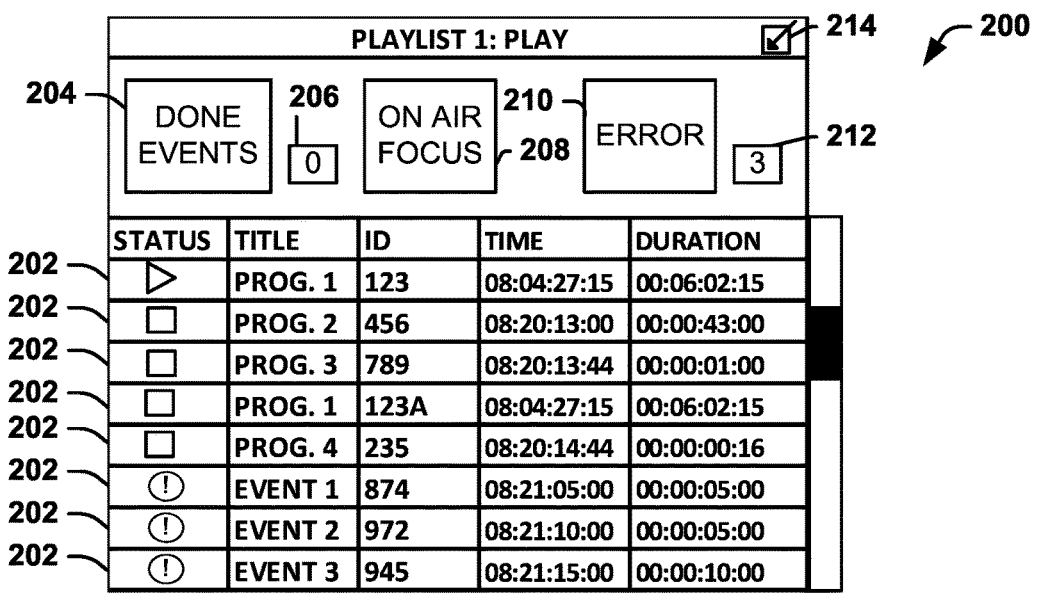
FIG. 5 illustrates an example of a playlist demonstrating an edit mode.

FIG. 5 illustrates an example of a playlist 200 in edit mode, such as can be presented in a dashboard (e.g., the playlist 2 illustrated in FIG. 2). In the example of FIG. 5, the playlist 200 includes a status (labeled in FIG. 5 as "STATUS"), an identifier (labeled in FIG. 5 as "ID") a starting time (labeled in FIG. 5 as "TIME") and a duration (labeled in FIG. 5 as "DURATION") for each of a plurality of events 202. In some examples, a media event 202 can be selected by a user. In response to such a selection, the event 202 becomes a selected event 202, such that specific information regarding the selected event 202 can be displayed, such as explained with respect to FIG. 2. Moreover, in edit mode, events 202 can be modified, or added to and/or removed from the playlist. Such a modification or adding and/or removing of events 202 can provide a mechanism for controlling media ingress.

The playlist 200 can include a done events GUI element (e.g., an icon) 204 that can be associated with a number 206 characterizing a number of events to have been completed in the playlist 200. Upon actuation of the done events GUI element 204, completed events can be shown or hidden to/from the user. The playlist 200 can also include an actuatable on air focus GUI element (e.g., an icon) 208. Upon actuation of the on air focus GUI element 208, the playlist 200 can jump to an on air event (e.g., an event currently being played) and can made to do so automatically at the start of each subsequent event. The playlist 200 can further include an actuatable error GUI element (e.g., an icon) 210 and an associated number 212 that characterizes a number of detected errors. Upon actuation of the error GUI element 210, a list of the detected errors can be presented to the user. It is noted that by employment of the error GUI element 210, the user need not search for and/or identify errors that have occurred or will occur in the future. In this manner, efficiency of managing media operations can be increased.

The playlist 200 can include a scrollbar that can allow the user to view and/or edit different portions of the playlist 200. Such a scrollbar can be implemented for view adjustments in both the view mode and the edit mode, for example. Moreover, the playlist 200 can include a playlist view GUI element (e.g., an icon) 214 that can be actuatable by the user. Upon actuation of the playlist view GUI element 214, the playlist 200 can be replaced with the playlist in view mode, such as disclosed with respect to FIGS. 3 and 4.

Figure 6:
FIG. 6 illustrates another example of a GUI that can be employed to facilitate managing media operations.

FIG. 6 illustrates an example of a GUI 250 similar to the GUI 50 illustrated in FIG. 2. For purposes of simplification of explanation, features common to the GUI 50 and 250 illustrated in FIG. 2 and FIG. 6 are not repeated and reference may be made back to FIG. 2 for additional information about such common features. In FIG. 6, the GUI 250 includes a first graphical container 252 that includes a list view 1 for a first playlist and a second graphical container 254 that includes a list view 2 for a second playlist. The GUI 250 can also include a playlist control 256 that can include, for example, one or more GUI elements (e.g., icons, drop down menus, dialog boxes and/or virtual controls) for interacting with the playlist content presented in list view 1 and/or list view 2. The GUI of FIG. 6 demonstrates a situation where the entire GUI area can be occupied with only a small number of lists. In FIG. 6, no dashboard containing playlists is presented in the GUI, but is instead occupied by a large area for managing a small number of lists. Due to the size of the containers 252 and 254, there is little space for other GUI elements. This can be contrasted with examples of FIGS. 2 and 8.

Figure 7:
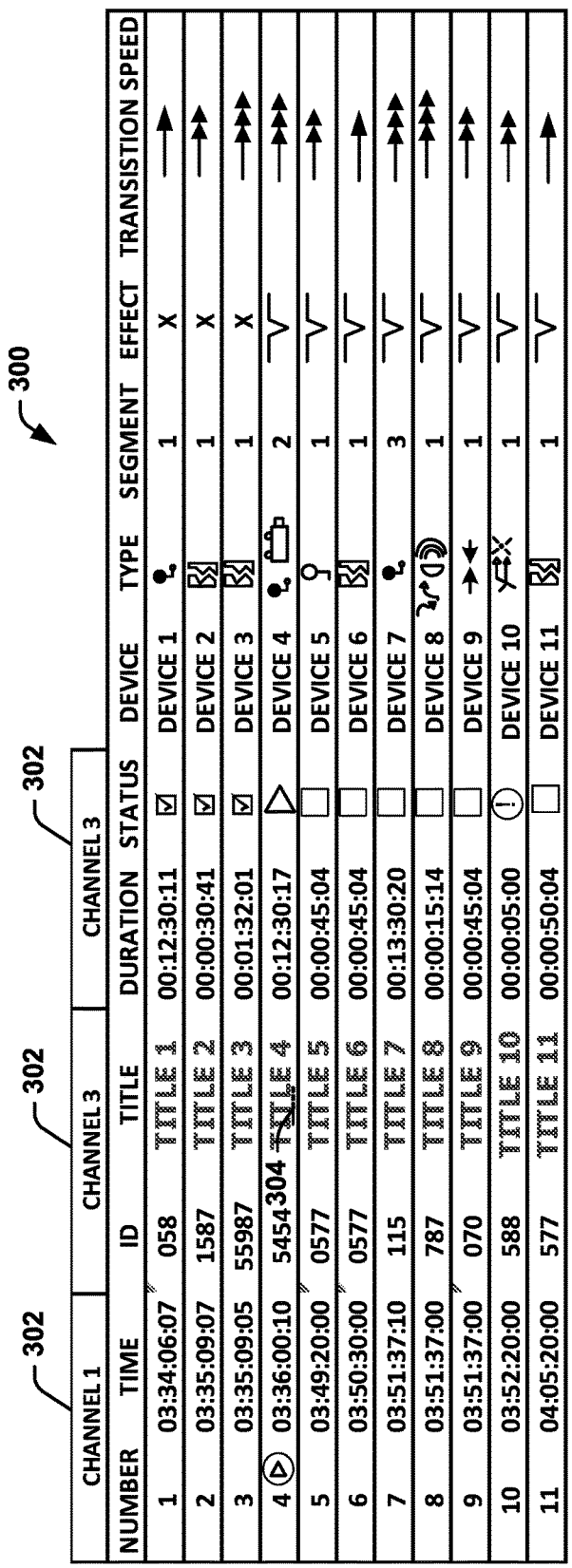
FIG. 7 illustrates an example of a list view.

FIG. 7 illustrates a GUI corresponding to list view 300 that could be employed, for example, as the list view 1 and/or the list view 2 illustrated in FIG. 6. The list view could correspond to a playlist for a given channel (e.g., a television channel). The list view could be implemented as a table, such as can include a plurality of events in the playlist, wherein each event corresponds to a row in the table. The rows can be sortable (e.g., or able to be filtered) based primarily on time, or another user selected heading, for example. In some examples, each event can be color-coded to indicate a condition of a given event. The list view can include channel tabs 302 that allow a user to select a list for a specific channel.

The list view can include a number (labeled in FIG. 7 "NUMBER") that identifies an ordered sequence number of each event. The list view can also include a starting time (labeled in FIG. 7 as "TIME") of a given event. Moreover, an on air event (event number 4) can be identified with a GUI element, such as a play icon. As an example, the on air event can include a time indicator 304, such as can depict a duration and time remaining of the on air event. The list view can also include a duration of each event (labeled in FIG. 7 as "DURATION"). The list view can also include a status (labeled in FIG. 7 as "STATUS") for each event. The status can be represented, for example with an icon. The list view can include a segment number (labeled in FIG. 7 as "SEGMENT") and transition speed (labeled in FIG. 7 as "TRANSITION SPEED") for each event. The list view can still further include a device identifier (labeled in FIG. 7 as "DEVICE") for each event. The device identifier can indicate, for example, a database or directory that stores a clip corresponding to a given event.

The list view can include an effect type (labeled in FIG. 7 as "EFFECT") for each event. The effect type can describe, for example, a transition event that occurs before playing of a given event. The effect type can be represented, for example with an icon. In one example, the effect type could be a "cut" effect type that can indicate that a system broadcasting events will switch directly from a previous event to a next event without modifying either the previous or next event. In another example, the effect type could be a "fade-fade" effect type that could indicate that the system will fade out of the previous event and fade into the next event. In yet another example, the effect type could be a "cut-fade" effect type that could indicate that the system can cut directly from the previous event and fade to the next event. In still another example, the effect type could be a "fade-cut" that can indicate that the system will fade out from the previous event, and cut directly into the next event. In still yet another example, the effect type could be a "crossfade" effect type (sometimes referred to as "mix" or "dissolve") effect type, wherein the system gradually dissolves into the next event from the previous event, such that the previous event and the next event are mixed together during a transition. In yet another example, the effect type could be a "wipe" that could indicate that the next event occupies an increasing portion of a television screen until the next event displaces the previous event.

Further, the list view can include a behavior type for each event (labeled in FIG. 7 as "TYPE") that describes a behavior and/or a modification of a given event. The type of an event can be represented, for example, by an icon, such as can be a composite representing a combination of behaviors. In one example, the type of event can be a "standard" behavior type that can indicate that a system broadcasting the events will start a next event immediately following a previous event and run the next event for the next event's fixed duration-sequential playout. In another example, the behavior type can be a "hard start" behavior type that can indicate the next event has a fixed, predefined start time rather than having the start time dynamically calculated based on a start time and duration of the previous event. In another example, the behavior type can be a "manual start" behavior type that can indicate that the next event starts only when triggered (e.g., by an operator or an external system). In yet another example, the behavior type can be an "upcount" behavior type that can indicate that the given event has an indeterminate duration (e.g., a live event). In still yet another example, the behavior type can be a "deadroll" behavior type that can indicate that the next event starts at a specific time, without interrupting a sequential playout of events on a playlist before the next event.

As a further example, the behavior type can be a "video switch" behavior type that can switch video from the previous event to the next event while maintaining the audio of the previous event. In a similar manner, the behavior type could be an "audio switch" behavior type that can switch the audio from the previous event to the next event while maintaining the video of the previous event. In yet another example, the behavior type could be a "time to next" (also referred to as a "next") behavior type that can provide a timer to a next event. In still another example, the behavior type can be a "record" behavior type that can perform a recording of a given event. In still yet another example, the behavior type could be an "exception" behavior type that can be used to identify and control exceptions to a compiling process. It is noted that in some examples, a given event may have multiple behavior types.

Some types of events, such as secondary events, can have certain behaviors, including an "offset start time" behavior type that can indicate that a given secondary event has a specified start time after a primary event with which the given secondary event is associated. In another example, the secondary event can have an "equality" behavior type that can indicate that the given secondary event runs until an end time of the associated primary event. In yet another example, the given secondary event can have a "backtimed" behavior type that can indicate that the given secondary event has a start time prior to the associated primary event. Similarly, the given secondary event can have an "end timed" behavior type that can have a start time that is timed back from an end of the primary event.

Figure 8:
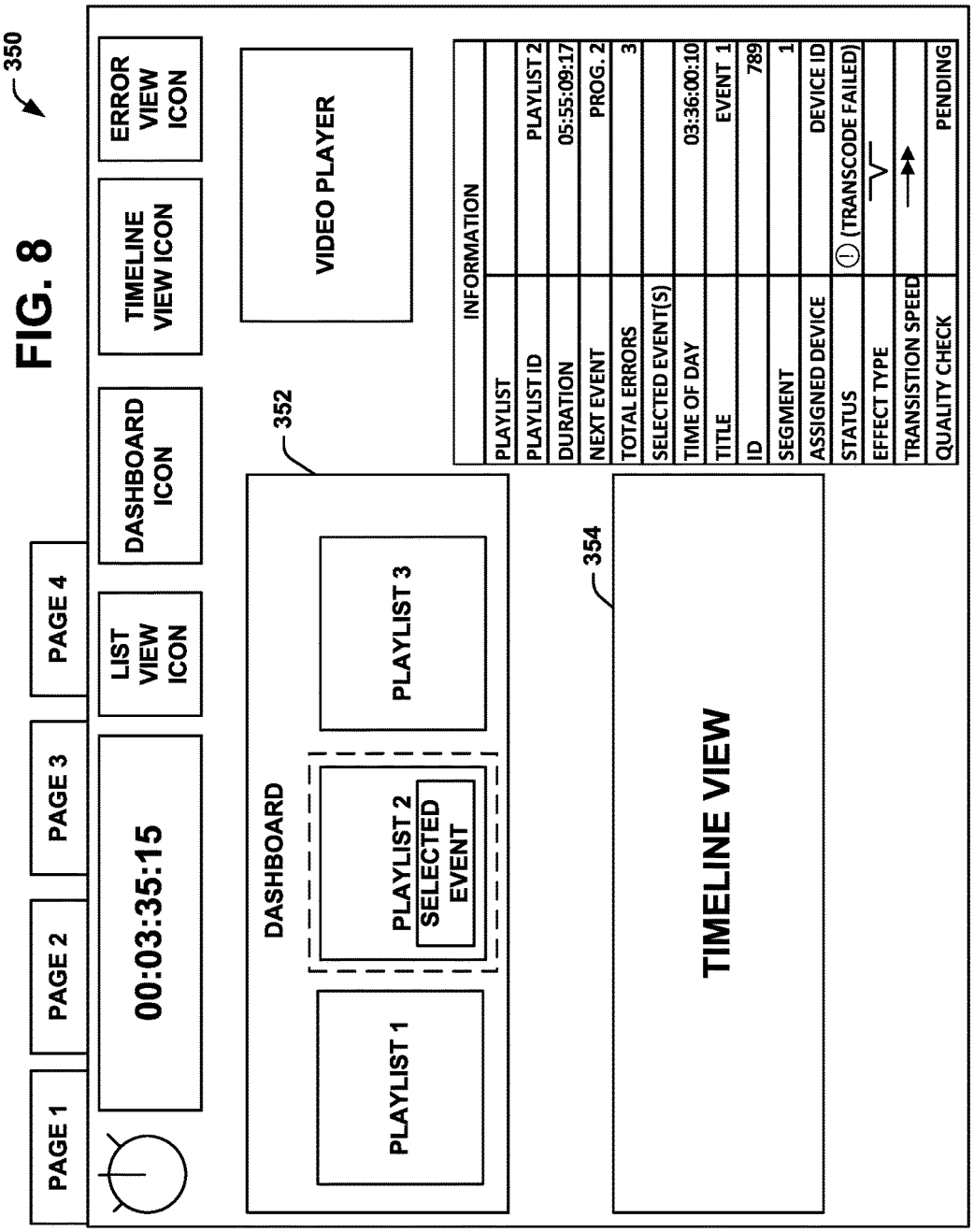
FIG. 8 illustrates another example of a GUI that can be employed to facilitate managing media operations.

FIG. 8 illustrates an example of a GUI 350 similar to the GUI 50 illustrated in FIG. 2. For purposes of simplification of explanation, features common to the GUI 50 and 350 illustrated in FIG. 2 and FIG. 8 are not repeated, as reference can be made back to FIG. 2 for additional information on such common features. In FIG. 8, the GUI 350 includes a dashboard 352 that could be implemented, for example in a manner similar to the dashboard 52 illustrated in FIG. 2. The GUI 350 can also include a graphical container that can present an instance of a timeline GUI for a selected playlist, demonstrated as timeline view 354. It will be appreciated that the example of GUI elements in FIG. 8 can afford a high level of detail by presenting the individual dashboard views 352 in combination with the independent flexibility to adjust the scope of the multi-channel timeline 354.

Figure 9:
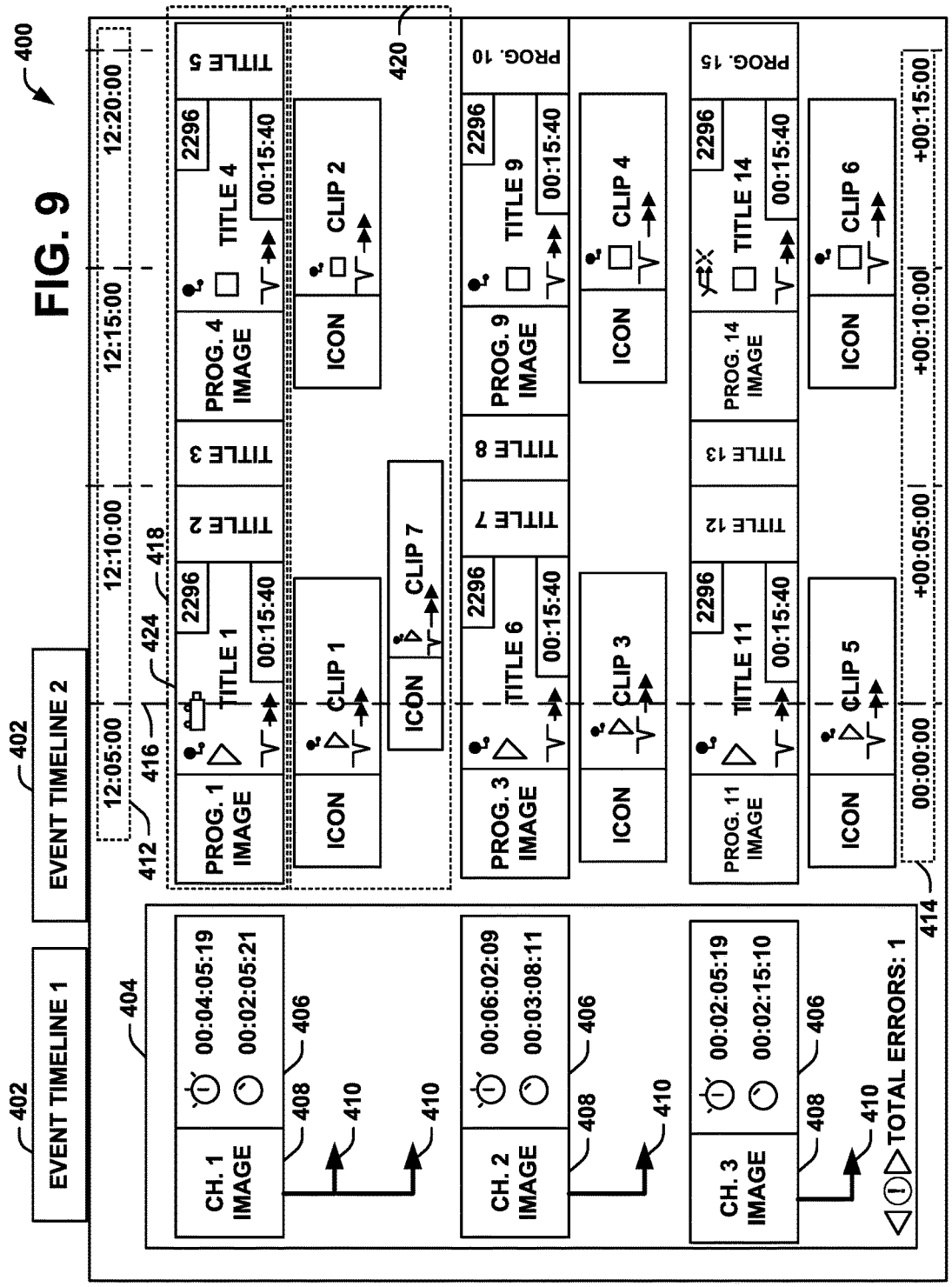
FIG. 9 illustrates an example of a timeline view.

FIG. 9 illustrates an example of a timeline GUI 400, such as can correspond to the timeline view 354 illustrated in FIG. 8. The timeline view 400 can include timeline tabs 402 that can be employed to switch to a different timeline view, such as to display timeline views for different channels. The timeline view 402 can include a channel GUI 404 that can provide information that identifies a plurality of channels that are demonstrated in the timeline view 402. The channel GUI 404 can include a channel label 406 for a plurality of channels.

In the example illustrated of FIG. 9, three channel labels 406 are illustrated for three different channels, demonstrated as channels 1, 2 and 3, but it is to be understood that in other examples, more or less channel labels could be included. Each channel label 406 can include a channel image 408, which could be implemented, for example, as a pictorial representation of a channel (e.g., a logo associated with the channel). Each channel label 406 can also include a total playlist time that can characterize, for example a total time needed to play remaining playlist for a given channel. Each channel label 406 can also include a running time that can characterize, for example, an amount of time that the current event has been playing for a given channel. The total time and the running time can be identified, for example, with icons. Each channel label 406 can also include secondary event indicators, such as can be represented as arrows 410, which can be directed towards secondary events for a given channel. The channel frame can further include an error count (labeled in FIG. 9 as "TOTAL ERRORS"). The error count can provide the total number of detected errors for each of the channels 1-3.

The timeline view 400 can also include a playlist timeline for each of the plurality of channels identified by the channel labels 406. The playlist timeline can be marked with a current time 412 and/or an offset time 414. Moreover, the playlist timeline can include a current time bar 416 that can identify, for example, the current position in a playlist for each of the plurality of channels identified by the channel labels 406. In such a situation, the current time bar 416 can cross on-air events for each of the plurality of channels. For purposes of simplification of explanation, details for a playlist timeline are described with respect to channel 1, but it is to be understood that the playlist timelines for other channels (e.g., channels 2 and 3) could be implemented in a manner similar to channel 1.

The playlist timeline of channel 1 includes a primary event timeline 418 and for example two secondary event timelines 420. The primary event timeline 418 can include a series of primary events, namely, events 1-5 (labeled in FIG. 9 as "PROG. 1-5"). Event one 424 can represent, a segment of a media program (e.g. a television program), a commercial or other short media event, a live event, or any other sequential media event. Event one 424 can include a program image that can include a representative image (e.g., generated from abstracted metadata) for event one 424. In some examples, event one 424 can be color coded to indicate a condition of event one 424. Event one 424 can include a title (labeled in FIG. 9 as "TITLE 1") that can identify the title of the associated program and/or the filename for an associated clip. Event one 424 can also include an effect type icon that can characterize a transitioning of event one 424. Event one 424 can further include a transition speed icon that characterizes a transition speed of event one 424. Event one 424 can still further include a play icon that indicates that event one 424 is currently being played. Event one 424 also includes a behavior type icon that characterizes a behavior type of event one 424. Moreover, event one 424 can include an event identifier (labeled in FIG. 9 as "2296") that can provide identification code for event one 424. Still further, event one 424 can include a duration clock that can provide a duration of event one 424. It is to be understood that other events can include less or more information.

The playlist timeline 418 can also include one or more secondary event timeline, such as a first secondary event timeline and a second secondary event timeline 420. Each of the secondary event timelines 420 can characterize secondary events that can be time correlated and played out concurrently with content represented by the primary timeline 418. Thus, each event in the secondary event timelines 420 can be implemented in a manner similar to event one 424 in the primary timeline.

Figure 10:
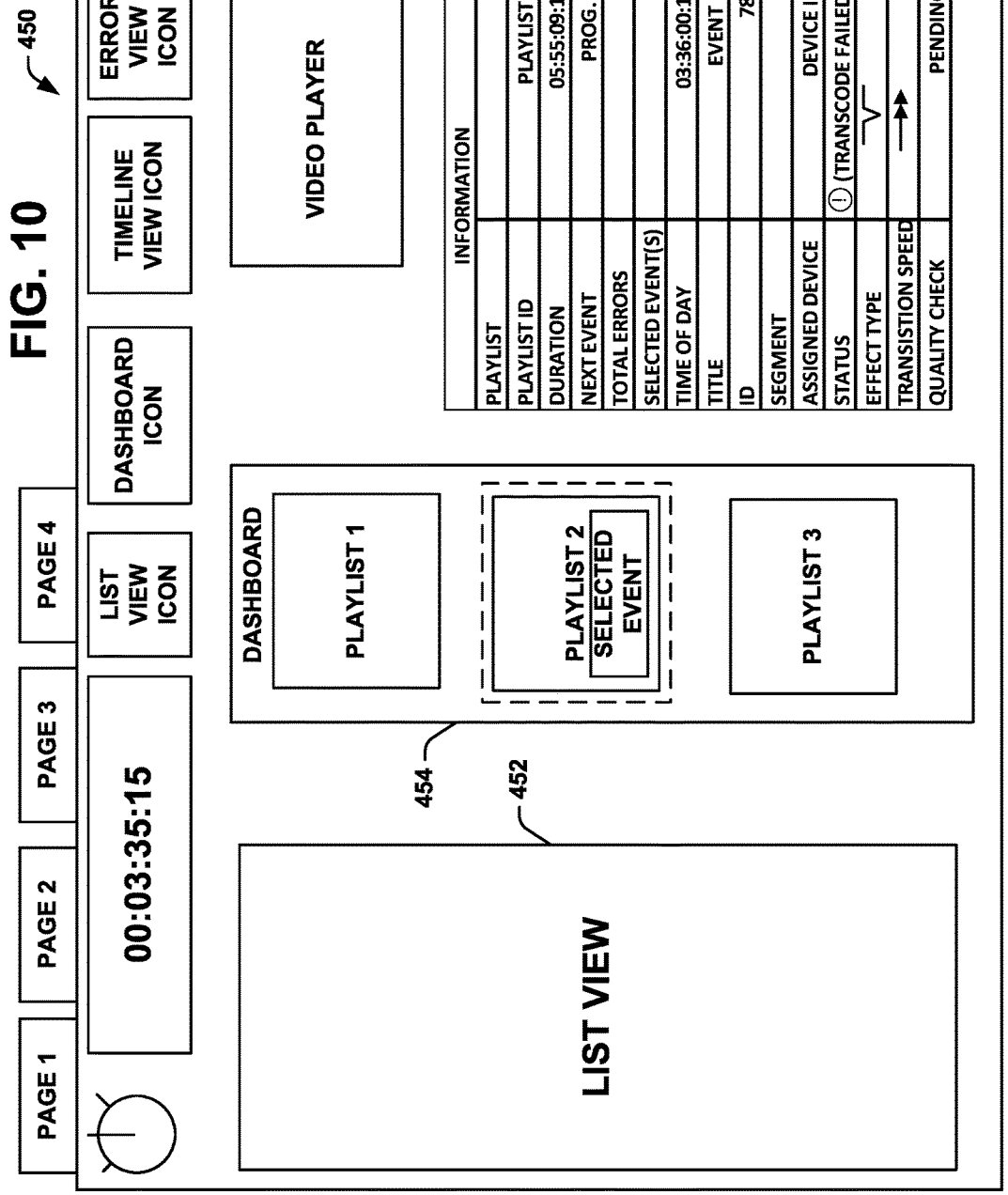
FIG. 10 illustrates another example of a GUI that can be employed to facilitate managing media operations.

FIG. 10 illustrates an example of a GUI 450 similar to the GUI 50 illustrated in FIG. 2. For purposes of simplification of explanation, features common to the GUI 50 and 450 illustrated in FIG. 2 and FIG. 10 are not repeated. In FIG. 10, the GUI 450 includes a list view 452 that could be implemented, for example in a manner similar to the list view 300 illustrated in FIG. 7. The GUI 450 can also include a dashboard 454 that could be implemented in a manner similar to the dashboard 52 illustrated in FIG. 2. The dashboard 454 can include instances of a playlist object corresponding to playlists for respective channels. Each playlist 456 programmed to switch between operating modes corresponding to different functionality without obstructing other playlists. In the example of FIG. 10, the list view 452 and the dashboard 454 can each be oriented vertically. As previously noted, the single detailed list view can be employed to display, one at a time, the lists represented by the multiple dashboards.

Figure 11:
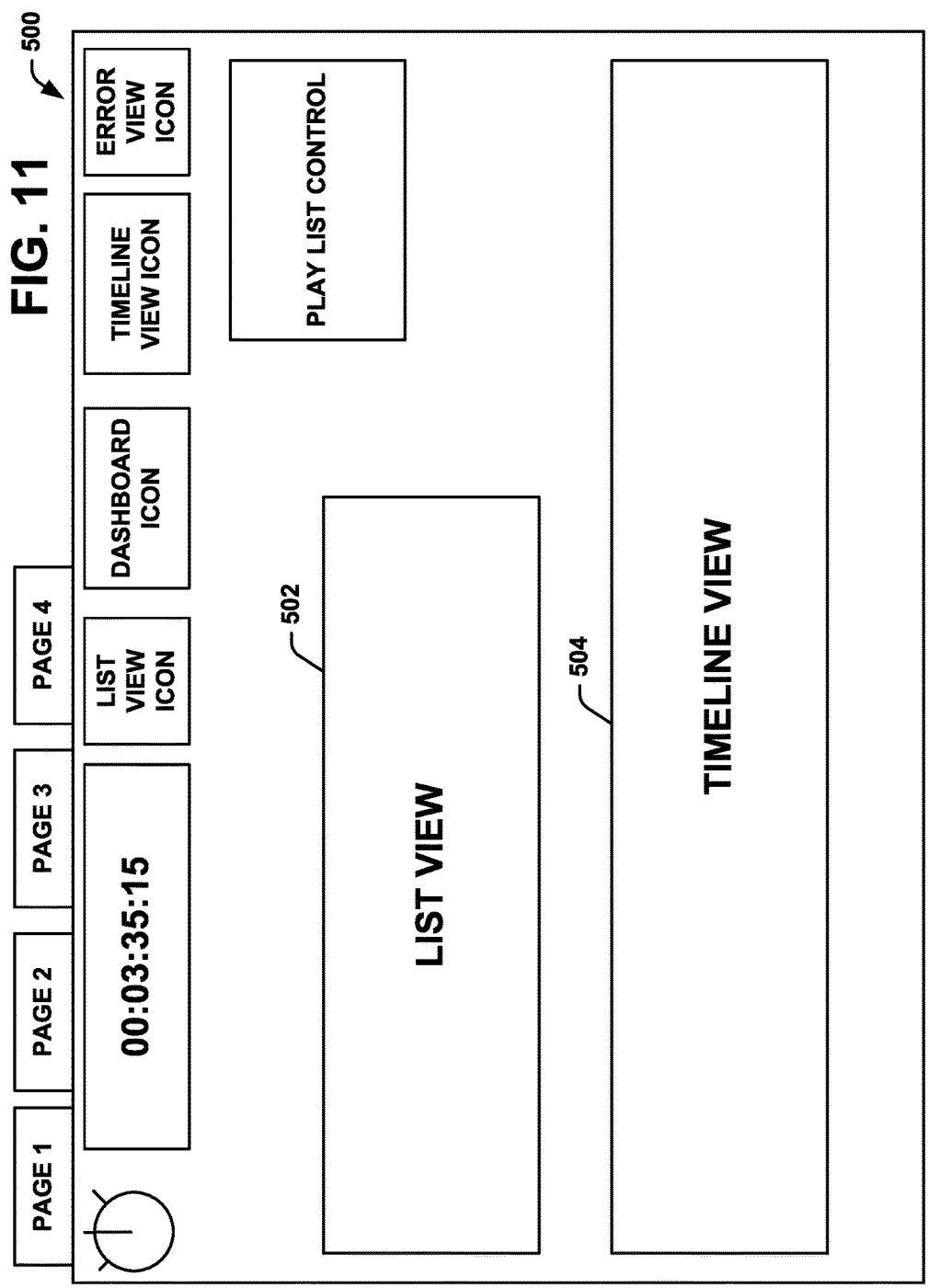
FIG. 11 illustrates another example of a GUI that can be employed to facilitate managing media operations.

FIG. 11 illustrates an example of a GUI 500 similar to the GUI 250 illustrated in FIG. 6. For purposes of simplification of explanation, features common to the GUI 250 and 500 illustrated in FIG. 6 and FIG. 11 are not repeated. In FIG. 10, the GUI includes a list view 502 that could be implemented, for example in a manner similar to the list view 300 of in FIG. 7. The GUI 500 can also include a timeline view 504 that could be implemented in a manner similar to the timeline view 400 illustrated in FIG. 9. The list view 502 and the timeline view 504 can be presented concurrently in the graphical framework of the GUI 500. In the example of FIG. 11, similar to FIG. 10, the single detailed list view can serve to display, one at a time, the lists represented by the timeline.

Figure 12:
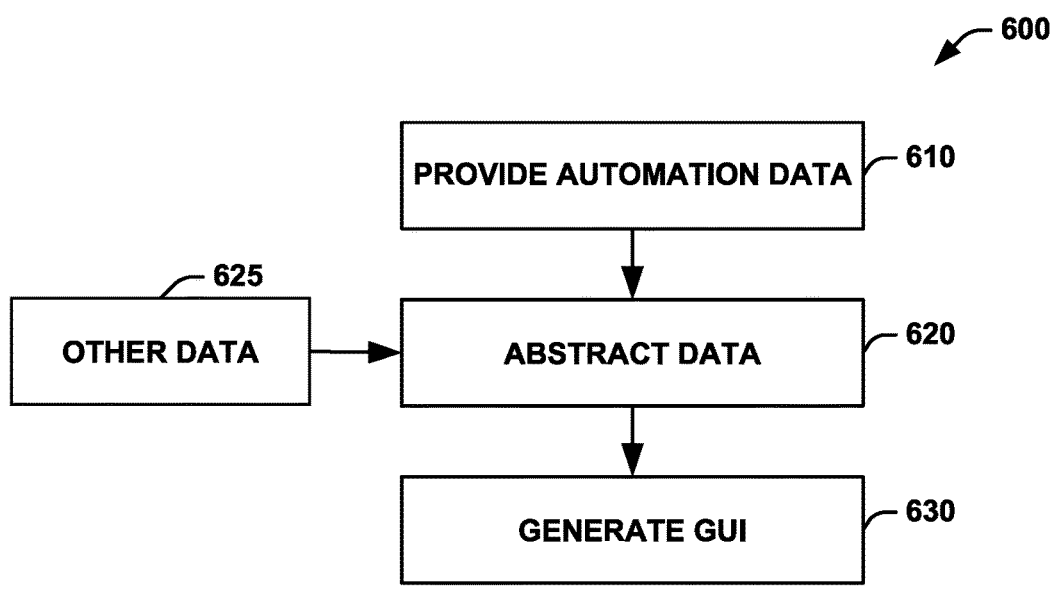
FIG. 12 illustrates a flowchart of an example of a method to facilitate managing media operations.

In view of the foregoing structural and functional features described above, example methods will be better appreciated with reference to FIG. 12. While, for purposes of simplicity of explanation, the example methods of FIG. 12 are shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method.

FIG. 12 illustrates an example of a flowchart depicting an example method 600 for providing a GUI (e.g., the GUI 26 of FIG. 1). The method could be performed, for example, by a client device, such as the client computer 4 illustrated in FIG. 1. In such a situation, the client computer can include an automation client. At 610, the automation client can acquire automation and scheduling data via an abstraction service (e.g., abstraction service 11 of FIG. 1), such as based on data provided by the automation server 6 illustrated in FIG. 1. At 620, data can be abstracted and/or manipulated to provide abstracted data. In one example, the abstraction and/or manipulation of the data can be performed by a data abstraction service (e.g., the data abstraction service 11 of FIG. 1) of the automation client. Additionally, at 625, one or more other data sources can provide other data and media for abstraction at 620. Such other data sources, for example, can correspond to extended metadata, video, images or other information related to the automation data, such as be accessed via a network based on the automation data.

At 630, a GUI generator can generate a GUI based on the abstracted data. For example, the GUI generator can instantiate playlist objects for each of a plurality of channels to provide corresponding GUIs to facilitate managing playlist data for the respective channels concurrently. The GUI can be implemented, for example, in a manner shown and described with respect to FIGS. 2-11. By employment of the method 600, a user can interact with the GUI to efficiently manage media operations for a plurality of channels.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system comprising:
a memory for storing machine readable instructions; and
a processing unit for accessing the memory and executing the machine readable instructions, the machine readable instructions comprising:
an automation client to facilitate managing media operations, the automation client comprising a graphical user interface (GUI) generator to provide a GUI that includes a plurality of playlists derived from abstracted media data, the plurality of playlists being presented concurrently in a graphical framework within which each of the plurality of playlists is programmed to operate in a selected mode of operation, in response to a user input;
wherein the graphical framework outputs a given playlist of the plurality of playlists in one of a list view and a timeline view, wherein the given playlist includes a plurality of events that each corresponds to a respective scheduled broadcast media event that is scheduled to be broadcast to a plurality of subscribers over one or more channels of a broadcast television system, a cable television broadcast system or a satellite television broadcast system, and wherein each of the plurality of events is associated with a set of icons that represent features of each respective event.

2. The system of claim 1, wherein the GUI generator is programmed to instantiate a playlist object based on the abstracted media data received from an automation service to provide each of the plurality of playlists.

3. The system of claim 1, wherein the given playlist provides an error message for an error detected in a particular event of the plurality of events.

4. The system of claim 1, wherein a given icon of the set of icons for each respective event characterizes an effect type of an associated event that represents a visual transition from the associated event to a next event of the plurality of events.

5. The system of claim 1, wherein a given icon of the set of icons for each respective event represents a behavior type of an associated event, wherein the behavior type characterizes at least a process of starting the associated event.

6. A system comprising:
a memory for storing machine readable instructions; and
a processing unit for accessing the memory and executing the machine readable instructions, the machine readable instructions comprising:
an automation client to facilitate managing media operations, the automation client comprising a graphical user interface (GUI) generator to provide a GUI that includes a plurality of playlists derived from abstracted media data, the plurality of playlists being presented concurrently in a graphical framework within which each of the plurality of playlists is programmed to operate in a selected mode of operation, in response to a user input;

wherein the graphical framework outputs a given playlist of the plurality of playlists in one of a list view and a timeline view, wherein the given playlist includes a plurality of events that each correspond to a scheduled broadcast media event and each of the plurality of events is associated with a set of icons that represent features of each respective event;

wherein a given icon of the set of icons for each respective event characterizes a transition speed of an associated event that represents a speed of transition to the associated event from a previous event of the plurality of events.

7. The system of claim 1, wherein the given playlist of the plurality of playlists is output in the list view and the GUI generator provides another graphical framework with another plurality of playlists in the timeline view.

8. The system of claim 1, wherein the given playlist is in the timeline view that provides a primary event timeline and a secondary event timeline, the primary event timeline includes a plurality of primary events and the secondary event timeline includes a secondary event corresponding to an event that is played out concurrently with at least one primary event of the plurality of primary events.

9. The system of claim 1, wherein the given playlist is in the timeline view that provides a primary event timeline and a secondary event timeline for each of a plurality of channels, the primary event timeline includes a plurality of primary events and the secondary event timeline includes a secondary event corresponding to an event that is played out concurrently with at least one primary event of the plurality of primary events.

10. The system of claim 9, wherein the timeline view comprises a current time bar that identifies a current position in a playlist for each of the plurality of channels.

11. The system of claim 1, wherein the given playlist of the plurality of playlists is in the list view that represents a playlist over a time period.

12. The system of claim 1, wherein a given event in the given playlist of the plurality of playlists is color coded to represent a feature of the respective playlist according to metadata describing a condition of the given event.

13. A method comprising:

abstracting media data received from an automation server;

generating a graphical user interface (GUI) based on the abstracted media data;

instantiating a playlist object based on the abstracted media data to concurrently provide a plurality of playlists within a graphical framework of the GUI, a given playlist of the plurality of playlists is programmed to switch, in response to a user input, from a first mode of operation to a second mode of operation, different from the first, without obstructing other playlists in the graphical framework; and outputting a given playlist of the plurality of playlists in the graphical framework in one of a list view and a timeline view, wherein the given playlist includes a plurality of events that each corresponds to a respective scheduled broadcast media event that is scheduled to be broadcast to a plurality of subscribers over one or more channels of a broadcast television system, a cable television broadcast system or a satellite television broadcast system, and each of the plurality of events is associated with a set of icons that represent features of each respective event.

14. The method of claim 13, further comprising concurrently presenting each of the plurality of playlists in the timeline view on separate non-overlapping portions of the graphical framework without obstructing the other playlists.

15. The method of claim 13, wherein the abstracted media data represents scheduled media events for a plurality of different channels, the method further comprising providing a dashboard corresponding to another graphical framework in which the plurality of playlists are presented.

16. A method comprising:

abstracting media data received from an automation server;

generating a graphical user interface (GUI) based on the abstracted media data;

instantiating a playlist object based on the abstracted media data to concurrently provide a plurality of playlists within a graphical framework of the GUI, a given playlist of the plurality of playlists is programmed to switch, in response to a user input, from a first mode of operation to a second mode of operation, different from the first, without obstructing other playlists in the graphical framework; and outputting a given playlist of the plurality of playlists in the graphical framework in one of a list view and a timeline view, wherein the given playlist includes a plurality of events that each correspond to a scheduled broadcast media event and each of the plurality of events is associated with a set of icons that represent features of each respective event, wherein a given icon of the set of icons for each respective event characterizes an effect type of an associated event that represents a visual transition from the associated event to a next event of the plurality of events.

17. The method of claim 13, wherein the given playlist provides an error message for an error detected in a particular event of the plurality of events.

18. The method of claim 13, wherein the given playlist of the plurality of playlists is output in the list view and the method further comprises outputting another plurality of playlists in another graphical framework in the timeline view.

19. A non-transitory computer readable medium having machine readable instructions comprising:

a graphical user interface (GUI) generator to provide a GUI to facilitate managing media events, the GUI generator instantiating a playlist object to provide a playlist for each of a plurality of broadcast media channels of a media broadcast system based on media data provided by an automation system, wherein the media broadcast system comprises at least one of a broadcast television system, a cable television broadcast system or a satellite television broadcast system, wherein each playlist of each broadcast media channel includes a plurality of events with each event corresponding to a respective scheduled broadcast media event that is scheduled to be provided to subscribers via one or more of the respective broadcast media channels, the GUI comprising a given graphical framework, corresponding to a timeline view in which a given plurality of playlists for a plurality of respective broadcast media channels of the plurality of broadcast media channels are concurrently displayed without obstruction, the GUI also comprising another graphical framework comprising a list view of another playlist for another broadcast media channel of the plurality of broadcast media channels, wherein at least two of the plurality of playlists are executed concurrently;

wherein each respective event in the list view and the timeline view is associated with a set of icons that represent features of each respective event.

20. The non-transitory computer readable medium of claim 19, wherein a given icon of the set of icons for each respective event characterizes a transition speed of an associated event that represents a speed of transition to the associated event from a previous event of the plurality of events.

\* \* \* \* \*